K. NARUSZEWICZ.
CASTER.
APPLICATION FILED APR. 11, 1919.
1,312,863.
Patented Aug. 12, 1919.
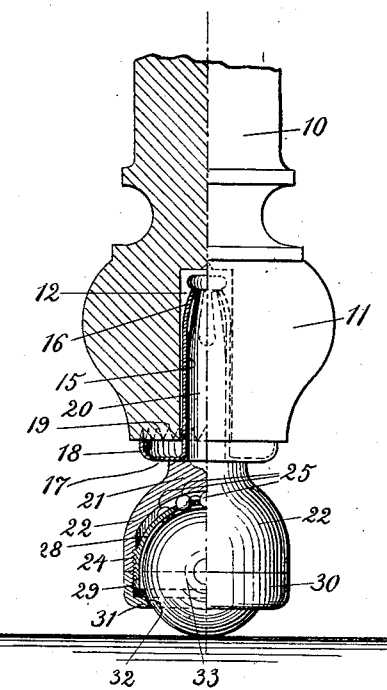
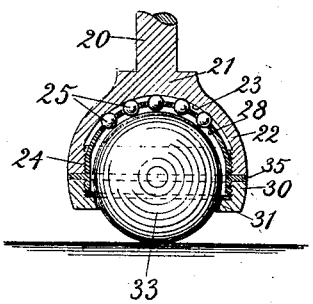
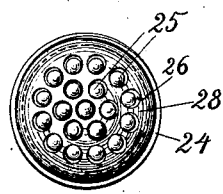
Konstanty Naruszewicz
INVENTOR
BY
ATTORNEY

UNITED STATES PATENT OFFICE.

KONSTANTY NARUSZEWICZ, OF CHICAGO, ILLINOIS.

CASTER.

1,312,863.   Specification of Letters Patent.   Patented Aug. 12, 1919.

Application filed April 11, 1919.   Serial No. 289,416.

*To all whom it may concern:*

Be it known that I, KONSTANTY NARUSZEWICZ, a citizen of Poland, residing at Chicago, county of Cook, and State of Illinois, have invented certain new and useful Improvements in Casters, of which the following is a specification.

This invention relates to improvements in casters and particularly to such as are used in connection with legs of furniture, as tables, chairs, desks, and the like.

The principal object of the invention is to provide a caster adapted to move in any direction with entire ease, so that the furniture may be moved from place to place as desired.

A further object is to provide a caster having a relatively large ball or sphere adapted to rest upon the floor, the ball being so held within the lower portion or base of the caster as to move freely therein, without danger of loss.

A still further object is to provide a caster of the type mentioned, in which the main large spheres or balls carry the weight of the article as transmitted through a plurality of smaller balls held in such manner as to be each independently operated.

These and other like objects are attained by the novel construction and combination of parts hereinafter described, and shown in the accompanying drawings, forming a material part of this disclosure, and in which—

Figure 1 is a partial side elevational and partial vertical view taken through the lower portion of a furniture leg and caster made in accordance with the invention.

Fig. 2 is a vertical sectional view showing a modified form of ball containing means, and Fig. 3 is a plan view of the ball cage or container.

Referring to the drawings, the table leg is indicated by the numeral 10, the same having an enlarged lower portion 11, containing a vertical central recess 12. A tubular sleeve 15, having a reduced upper end 16, is fitted into the opening 12 so as to adhere frictionally, the lower end of the sleeve being expanded into disk-like plate 17 having raised flanged edges 18, terminating in sharp spur-like points 19, enterable into the lower portion 11 of the table leg.

Engaged in sleeve 15 is a stem or shank 20, the same being formed with a shouldered base 21, adapted to make contact with the lower side of the disk 17, the base 21 being expanded into a semi-spherical body 22, containing a cavity 23, the lower edge of the body 22 having an internally screw thread 24, while the interior of the cavity 23 is smoothly finished and adapted to make peripheral contact with a plurality of balls 25 held in spaced relation by being inserted in openings 26, formed in a concavo-convex shell-like cage or container 28, which as shown in Figs. 1 and 2, is provided with external screw threads 29 at their outer edges engageable in the screw thread 24 of the body.

The screw threads 29 of the cage 28 extend below the body 22 and are engageable with similar internal screw threads formed in the annular flange or ring 30, of a cap 31, having a central concave opening 32 by means of which the ball 33 is held in engagement within the recess body so as to form peripheral contact with the small balls 25 in a well known manner.

In the modification shown in Fig. 2, the cage 28 is provided with an annular flange 35 adapted to be secured between the end of the body 22 and ring 30, of the cap 31, the construction in other respects being as previously described.

From the foregoing it will be seen that a neat and effective form of ball caster has been disclosed, which is substantially indestructible and capable of long and continued service.

Having thus described my invention what I claim as new and desire to secure by Letters Patent, is:—

In a ball caster, the combination with a body having a partial spherical cavity and provided with internal screw threads at its lower edge, of a concavo-convex cage threaded to engage with the internal threads and containing a plurality of openings, balls loosely engaged in said openings contactable with the surface of said cavity, a sphere freely received in said cage in contact with said balls, and a cap adapted to retain said sphere within said cavity.

In testimony whereof I have affixed my signature.

KONSTANTY NARUSZEWICZ.